Patented Apr. 22, 1930

1,755,668

UNITED STATES PATENT OFFICE

FRIEDRICH SCHLOSSER, OF HOCHST-ON-THE-MAIN, AND MAX PAQUIN, OF KOENIGSTEIN IN TAUNUS, GERMANY, ASSIGNORS TO I. G. FARBENINDUSTRIE AKTIENGESELLSCHAFT, OF FRANKFORT-ON-THE-MAIN, GERMANY

PROCESS FOR REFINING THE RAW OIL OF TURPENTINE

No Drawing. Application filed August 31, 1925, Serial No. 53,742, and in Germany September 12, 1924.

The present invention relates to a process for refining the raw oil of turpentine produced in the manufacture of synthetic camphor.

In the manufacture of synthetic camphor a raw oil of turpentine is produced for which a technical or industrial use can be found only with difficulty on account of its disagreeable and pungent odor and its undesirable drying properties. This raw oil of turpentine has been subjected to a fractional distillation and attempts have been made to utilize the several fractions, i. e., the fraction which boils at low temperature and does not resinify substantially when evaporated, and the fraction which contains resinifying constituents and boils at high temperature. The said fractions, however, show also the disadvantages above mentioned so that a technical or industrial use for them can be found only with difficulty.

Now we have found that products of technical value can be obtained from the raw turpentine oil produced in the manufacture of the said oil synthetic camphor by treating the said oil with acids or alkalies or oxidizing agents or halogens. We wish to state that by the term "turpentine oil" we mean either the whole turpentine oil or any of its fractional distillation products. The treatment of the distillation products. The treatment of the turpentine oil may take place in the cold or in the heat and there may also be employed catalytic substances or pressure or both. The odor of the product is thereby rendered milder and more agreeable. By varying the duration or intensity of the treatment one may obtain products of which the quantity of the high-boiling and resinifying fraction is increased at the expense of the fraction boiling at low temperature. The low-boiling fraction which evaporates substantially without resinifying may be used as a perfect substitute for oil of turpentine, while the high-boiling and resinifying fraction is an excellent substitute for linseed oil.

The process may be carried out in such a way that the whole of the oil produced by the camphor process is subjected to a treatment with acids, etc., whereupon the product formed is subjected to a fractional distillation. Thus fractions are obtained similar respectively to oil of turpentine and linseed oil. Another method consists in subjecting the raw oil to a fractional separation and then treating the fractional portions so obtained separately in an oxidizing, etc., manner. The process thus may be executed in one or the other way according to the requirements of the industrial market.

The following examples illustrate the invention, the parts being by weight.

1. 400 parts of decamphorated oil of turpentine are treated while stirring well with 45 parts of sulfuric acid (specific gravity 1.48) which are added gradually. Care must be taken by cooling that the temperature does not rise above 35-40° centigrade. At the end of 5 hours the mass is washed with water until neutral reaction is shown. By fractionation there is obtained (apart from a small residue) a substantially non-resinifying product as well as a resinifying product. These products are free of pungent odor which is now mild and agreeable.

The first product may be used, owing to its agreeable odor, as a substitute for turpentine oil, the second product is an oil of a high boiling point and may be used, owing to its goods siccative properties, as a substitute for linseed oil.

If a relatively large quantity of the substitute for turpentine oil is desired, the said method is advantageous.

2. 400 parts of the non-resinifying fraction of the decamphorated oil of turpentine are treated according to Example 1. The resulting reaction product may be divided into several fractions.

The main fraction possesses a mild and agreeable odor and may be used as a substitute for the oil of turpentine. The raw reaction product when washed shows a feeble coloration and is entirely free of acid; it may likewise be used for technical and industrial purposes without a previous fractionation in a similar way as the main fraction.

3. 400 parts of decamphorated oil of turpentine are treated while stirring with 30 parts of sulfuric acid (specific gravity 1,48) which are slowly added. The temperature is not permitted to rise above 80–90° C. The fractions obtained after washing have the same properties as those described in Example 1. This procedure is preferred in case a relatively large quantity of resinifying oil is wanted.

4. 400 parts of the low-boiling portion of the decamphorated oil of turpentine are treated according to Example 3. From the reaction product there may be obtained for instance two fractions in the proportion of 34%, boiling point 120–200° C.
63%, boiling point 200–350° C.

The product obtained from the low-boiling fraction alone thus mainly consists in the resinous and high-boiling product which may be used as a substitute for linseed oil without fractionation.

5. 400 parts of the high-boiling resinifying fraction of the decamphorated oil of turpentine are treated while stirring with 45 parts of sulfuric acid (specific gravity 1,52). When the oil has cleared up after three hours it is washed with water and heated to 160° C. for eliminating small quantities of water. The product obtained has a very mild odor and may be used directly or after a previous distillation as an excellent drying substitute for linseed oil.

6. 400 parts of the decamphorated oil of turpentine are boiled in a reflux apparatus for 8 hours with 40 parts of a potassium hydroxide solution (50%) to which is added a solution of 6 parts copper chloride in 20 parts of water as well as 4 parts of finely divided copper bronze. With slight increase of the high-boiling resinifying fraction a product of a mild odor is obtained which may be used like that obtainable according to Example 1.

7. 400 parts of the decamphorated oil of turpentine are treated with 8 parts of ferric chloride dissolved therein with a current of air while boiling in a reflux apparatus. According to the time of reaction mixtures are obtained containing more or less increased high-boiling fractions of a mild and agreeable odor.

By the use of strongly acting catalyzers, for instance spongy platinum, or by the use of strongly oxidizing gases, for instance oxygen, there is obtained apart from a considerable increase of the resinifying fraction an essentially lighter shade in color.

The operation according to Examples 6 and 7 may be applied to the resinifying fraction alone or to the non-resinifying fraction alone in the same manner as well as under pressure at a high temperature.

8. 400 parts of the low-boiling, non-resinifying fraction of the decamphorated oil of turpentine are treated while cooling with a current of chlorine. When the saturation is finished, it is washed with a strongly diluted solution of sodium carbonate. 92% of the reaction product boils at 155–200° centigrade, 8% of the same at 200–250° centigrade. The content of chlorine is 10,1% on the average. The product obtained may be widely used as a difficultly burning solvent of high-boiling point.

9. Into a residue of an oil of turpentine obtained by distilling off the low-boiling non-resinifying fraction there is introduced oxygen in a closed vessel for 5 to 6 hours at a temperature of about 140–150° centigrade. A polymerization of the oil takes place. The drying capacity of the residue is improved in such a way that a useful substitute for linseed oil is obtained.

An addition of about 10% of wood-oil increases the power of drying and resistance of the oil-film.

By mixing the oil, thus treated, with coloring substances, such as ferric oxide for producing red shades, lithopone or barite with carbon or ultramarine for producing gray or blue shades, a variety of colors may be obtained.

When the resulting residue from the oil of turpentine is spread in a thin layer on a glass plate, it becomes uniformly resinous after 4 days and after 6 days so dry that it almost loses its stickiness, whereas the starting material resinifies only very unevenly and only after 8 days becomes so dry as to almost lose its stickiness.

When the residue from the oil of turpentine in first treated as above indicated and there is then added thereto 0,5% of a siccative substance (lead and manganese siccative), it becomes uniformly resinous after 2 days and after 4 days so dry as to lose its stickiness.

By the processes above specified it is possible to obtain a pure linseed oil varnish of a great drying-power without having to add any linseed oil.

For preparing oil paints, the residues from oil of turpentine, after being previously treated as above indicated, are mixed and stirred with the respective coloring substances in the proportion of 1:1. The colors thus obtained adhere very well to wood and iron and possess sufficient elasticity and excellent covering-power. For the preparation of color-lakes the proportion of the ingredients may for instance be as follows:

25% of residue from oil of turpentine (previously treated).
50% of coloring matter.
15% of resin (colophony).
10% of siccative.

The oils and lake-colors above referred to may be beautified in the usual manner and rendered still more resistant to atmospheric influences by adding thereto a small quantity of wax or stearin pitch or the like.

Having now described our invention what we claim is:

1. Process for refining the residue of oil of turpentine produced in the manufacture of synthetic camphor which comprises treating the residue with a strong mineral acid.

2. Process for refining the residue of oil of turpentine produced in the manufacture of synthetic camphor which comprises treating the residue with sulfuric acid.

3. The process for refining the residue of oil of turpentine produced in the manufacture of synthetic camphor which comprises treating the residue with sulfuric acid of a specific gravity of about 1.48 at a temperature of about 35–90° C.

4. As a new product the polymerization product of decamphorated oil of turpentine having drying properties and being suitable for use as a substitute for linseed oil.

In testimony whereof, we affix our signatures.

FRIEDRICH SCHLOSSER.
MAX PAQUIN.